US012003027B2

(12) United States Patent
Ng et al.

(10) Patent No.: US 12,003,027 B2
(45) Date of Patent: Jun. 4, 2024

(54) MAGNETO-ELECTRIC DIPOLE ANTENNA

(71) Applicant: SUN DIAL TECHNOLOGY LIMITED, Hong Kong (CN)

(72) Inventors: Kungbo Ng, Hong Kong (CN); Hang Wong, Hong Kong (CN); Quanwei Lin, Hong Kong (CN)

(73) Assignee: SUN DIAL TECHNOLOGY LIMITED, Hong Kong (CN)

( * ) Notice: Subject to any disclaimer, the term of this patent is extended or adjusted under 35 U.S.C. 154(b) by 75 days.

(21) Appl. No.: 17/794,653

(22) PCT Filed: Sep. 16, 2020

(86) PCT No.: PCT/IB2020/058603
§ 371 (c)(1),
(2) Date: Jul. 22, 2022

(87) PCT Pub. No.: WO2021/148858
PCT Pub. Date: Jul. 29, 2021

(65) Prior Publication Data

US 2023/0075273 A1 Mar. 9, 2023

(30) Foreign Application Priority Data

Jan. 24, 2020 (HK) .......................... 32020002028.9

(51) Int. Cl.
*H01Q 19/10* (2006.01)
*H01Q 1/12* (2006.01)
(Continued)

(52) U.S. Cl.
CPC ............ *H01Q 19/108* (2013.01); *H01Q 1/12* (2013.01); *H01Q 1/36* (2013.01); *H01Q 21/26* (2013.01)

(58) Field of Classification Search
CPC ........ H01F 38/14; H01F 27/36; H01F 27/366; H01F 27/361; H01F 27/363;
(Continued)

(56) References Cited

U.S. PATENT DOCUMENTS 10,854,977 B2 * 12/2020 Chiu .................... H01Q 21/065
11,271,311 B2 * 3/2022 Chiu ........................ H01Q 5/15
(Continued)

FOREIGN PATENT DOCUMENTS

CN 106299664 A 1/2017
CN 106450706 A 2/2017
CN 107799891 A 3/2018

OTHER PUBLICATIONS

International Search Report for PCT/IB2020/058603, Prepared by the National Intellectual Property Administration, PRC, dated Dec. 30, 2020, 3 Pages.

*Primary Examiner* — Monica C King
(74) *Attorney, Agent, or Firm* — Brooks Kushman P. C.; John E. Nemazi

(57) ABSTRACT

A magneto-electric dipole antenna comprising a magnetic dipole antenna portion and an electric dipole antenna portion arranged to form a complementary antenna is disclosed. The electric dipole antenna portion comprises a plurality of electric patch portions. Each electric patch portion comprises a first patch region of a first conductivity and a second patch region of a second conductivity lower than the first conductivity, and wherein the first patch region and the second patch region cooperate to define an electrical current path of the dipole antenna portion.

20 Claims, 10 Drawing Sheets

(51) Int. Cl.
*H01Q 1/36* (2006.01)
*H01Q 21/26* (2006.01)

(58) Field of Classification Search
CPC .. H01F 27/2885; H01F 27/2804; H01F 27/38; H01F 29/02; H01F 41/041; H01F 2027/348; H01F 27/28; H01F 21/12; H01F 41/04; H01F 17/0013; H01F 27/2823; H01F 27/29; H01F 17/00; H01F 17/0006; H01F 2027/2809; H01F 21/02; H01F 27/2828; H01F 27/292; H01F 41/00; H01F 41/074; H01F 5/00; H01F 5/003; H01F 7/06; H01F 27/2871; H01F 27/40; H01F 17/02; H01F 21/005; H01F 27/22; H01F 27/30; H01F 27/42; H01F 38/18; H01F 41/32; H01Q 7/00; H01Q 1/38; H01Q 1/42; H01Q 7/005; H01Q 1/526; H01Q 1/36; H01Q 9/0414; H01Q 9/0407; H01Q 21/065; H01Q 21/28; H01Q 1/085; H01Q 1/24; H01Q 1/243; H01Q 7/06; H01Q 9/0421; H01Q 1/2266; H01Q 1/248; H01Q 21/26; H01Q 9/285; H01Q 7/04; H01Q 19/005; H01Q 21/24; H01Q 5/40; H01Q 9/0428; H01Q 1/2283; H01Q 1/2291; H01Q 1/246; H01Q 1/521; H01Q 21/30; H01Q 5/371; H01Q 5/378; H01Q 9/0435; H01Q 9/045; H01Q 9/16; H01Q 1/32; H01Q 1/3283; H01Q 1/428; H01Q 1/48; H01Q 1/523; H01Q 21/00; H01Q 21/062; H01Q 21/245; H01Q 23/00; H01Q 3/26; H01Q 9/0442; H01Q 9/26; H01Q 1/02; H01Q 1/1207; H01Q 1/1228; H01Q 1/125; H01Q 1/2225; H01Q 1/245; H01Q 1/3241; H01Q 1/40; H01Q 1/422; H01Q 15/144; H01Q 19/00; H01Q 19/10; H01Q 21/0025; H01Q 21/0075; H01Q 21/0087; H01Q 21/10; H01Q 21/20; H01Q 3/04; H01Q 3/242; H01Q 5/25; H01Q 5/307; H01Q 5/335; H01Q 5/364; H01Q 5/385; H01Q 9/0457; H01Q 9/145; H01Q 9/28; H01Q 9/40; H01Q 1/005; H01Q 1/007; H01Q 1/081; H01Q 1/1242; H01Q 1/2208; H01Q 1/2216; H01Q 1/2258; H01Q 1/2275; H01Q 1/244; H01Q 1/273; H01Q 1/288; H01Q 1/325; H01Q 1/3275; H01Q 1/3291; H01Q 1/421; H01Q 1/50; H01Q 13/02; H01Q 13/06; H01Q 13/08; H01Q 13/10; H01Q 15/14; H01Q 15/24; H01Q 19/106; H01Q 19/108; H01Q 19/24; H01Q 21/0006; H01Q 21/005; H01Q 21/06; H01Q 21/061; H01Q 21/064; H01Q 21/205; H01Q 21/29; H01Q 25/00; H01Q 25/005; H01Q 3/2617; H01Q 3/2629; H01Q 3/30; H01Q 3/36; H01Q 3/446; H01Q 5/15; H01Q 5/20; H01Q 5/321; H01Q 5/328; H01Q 5/392; H01Q 5/42; H01Q 5/48; H01Q 9/0464; H01Q 9/265; H01Q 9/27; H01Q 9/30; H01Q 9/36; H01Q 21/0012; H01Q 13/103; H01Q 3/44; H01Q 15/0086; H01Q 21/0031; H01Q 9/04; H01Q 1/364; H01Q 21/08; H01Q 9/14; H01Q 21/0056; H01Q 9/42; H01Q 15/0026; H01Q 15/0066; H01Q 25/001; H01Q 5/314; H01Q 15/00; H01Q 3/2676; H01Q 3/24; H01Q 5/47; H01Q 1/28; H01Q 1/34; H01Q 13/18; H01Q 13/206; H01Q 15/0033; H01Q 3/28; H01Q 3/34; H01Q 1/1285; H01Q 15/0006; H01Q 15/0053; H01Q 1/241; H01Q 3/46; H01Q 1/12; H01Q 11/105; H01Q 15/002; H01Q 15/006; H01Q 3/01; H01Q 5/30; H01Q 13/085; H01Q 5/50; H01Q 9/0485

See application file for complete search history.

(56) References Cited

U.S. PATENT DOCUMENTS

| | | | | |
|---|---|---|---|---|
| 2014/0071006 | A1 | 3/2014 | Chan et al. | |
| 2015/0116173 | A1 | 4/2015 | Zhang et al. | |
| 2017/0187100 | A1* | 6/2017 | Fotheringham ...... | H01Q 19/067 |
| 2019/0198998 | A1* | 6/2019 | Chiu ...................... | H01Q 15/24 |

* cited by examiner

Fig. 1
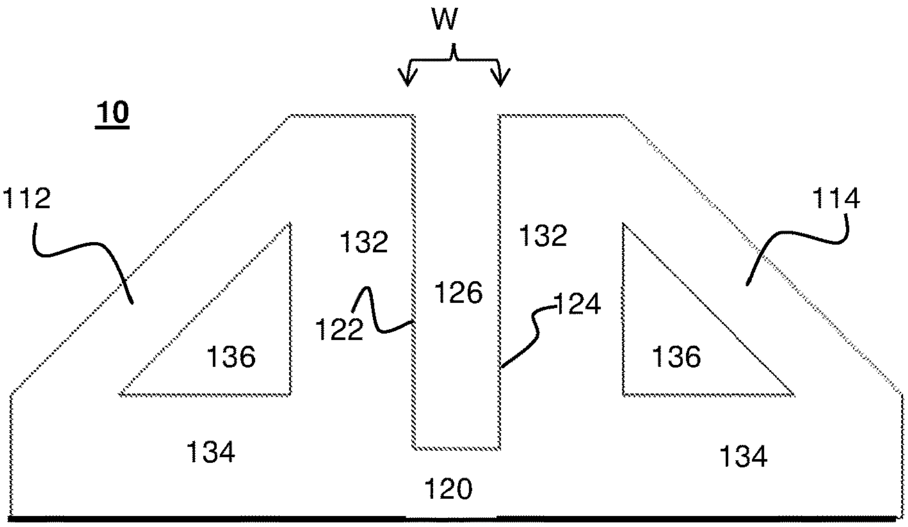
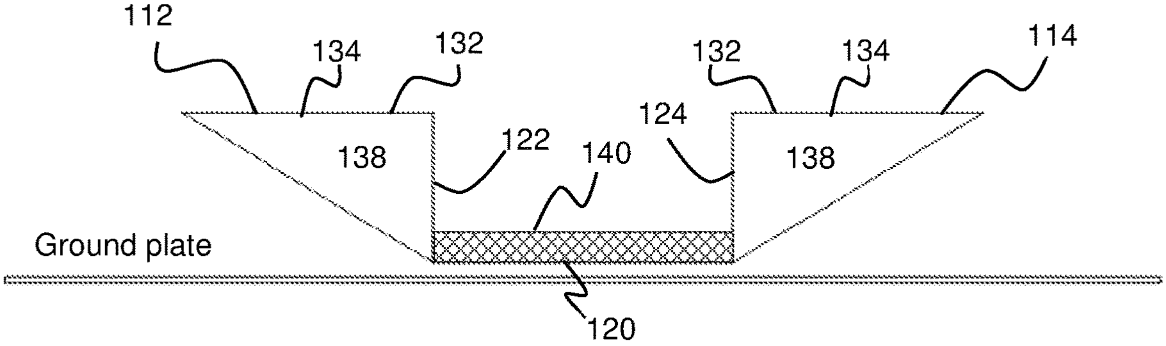
Fig. 1A
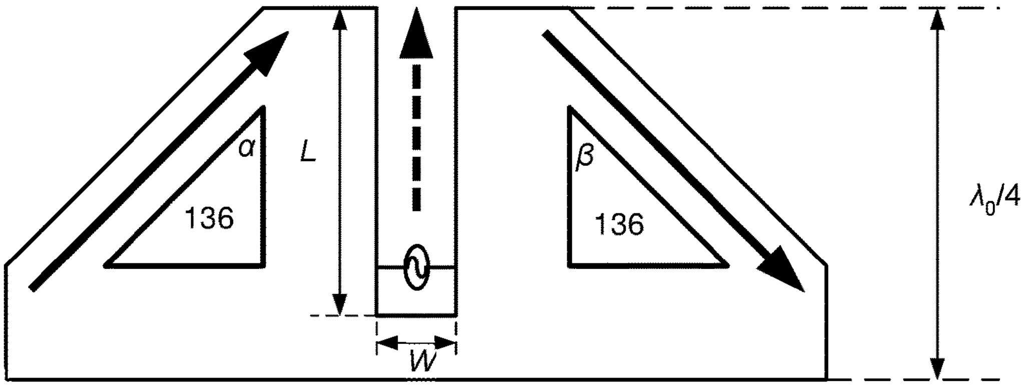
Fig. 1B

Fig. 3B1
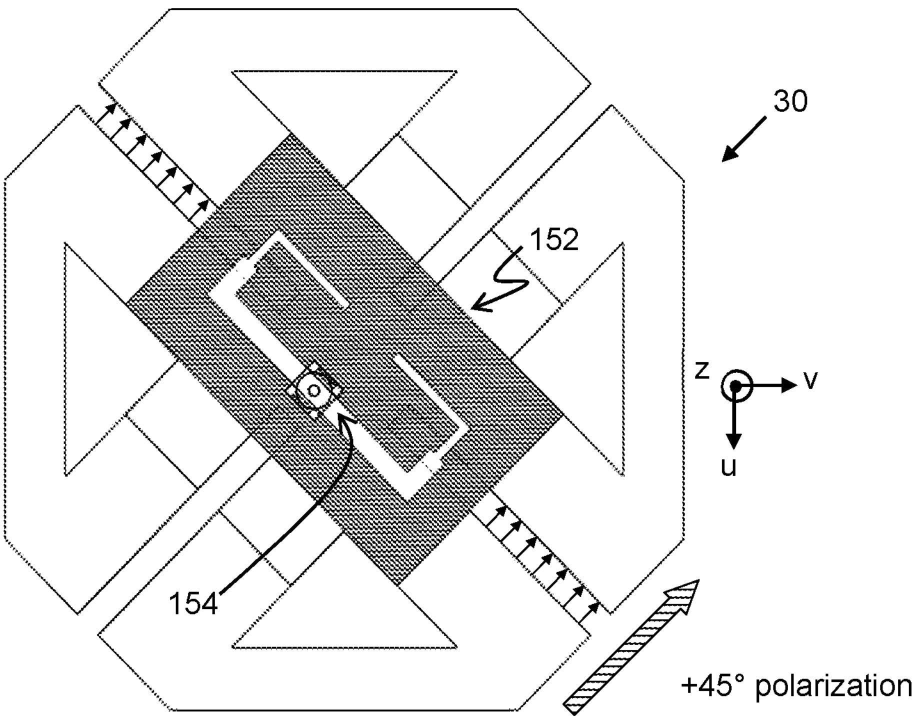
Fig. 3B2
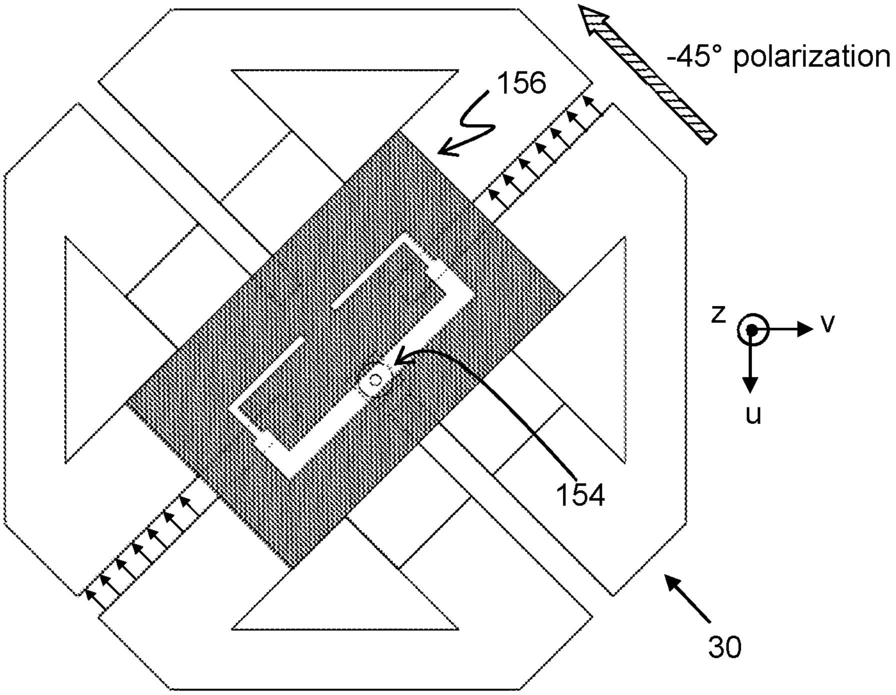

Fig. 3C
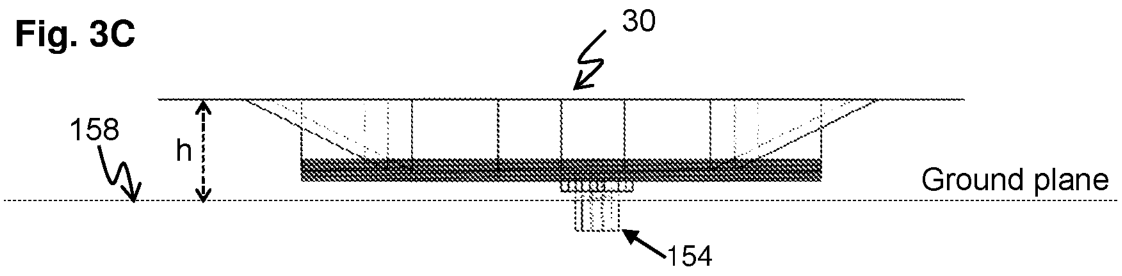
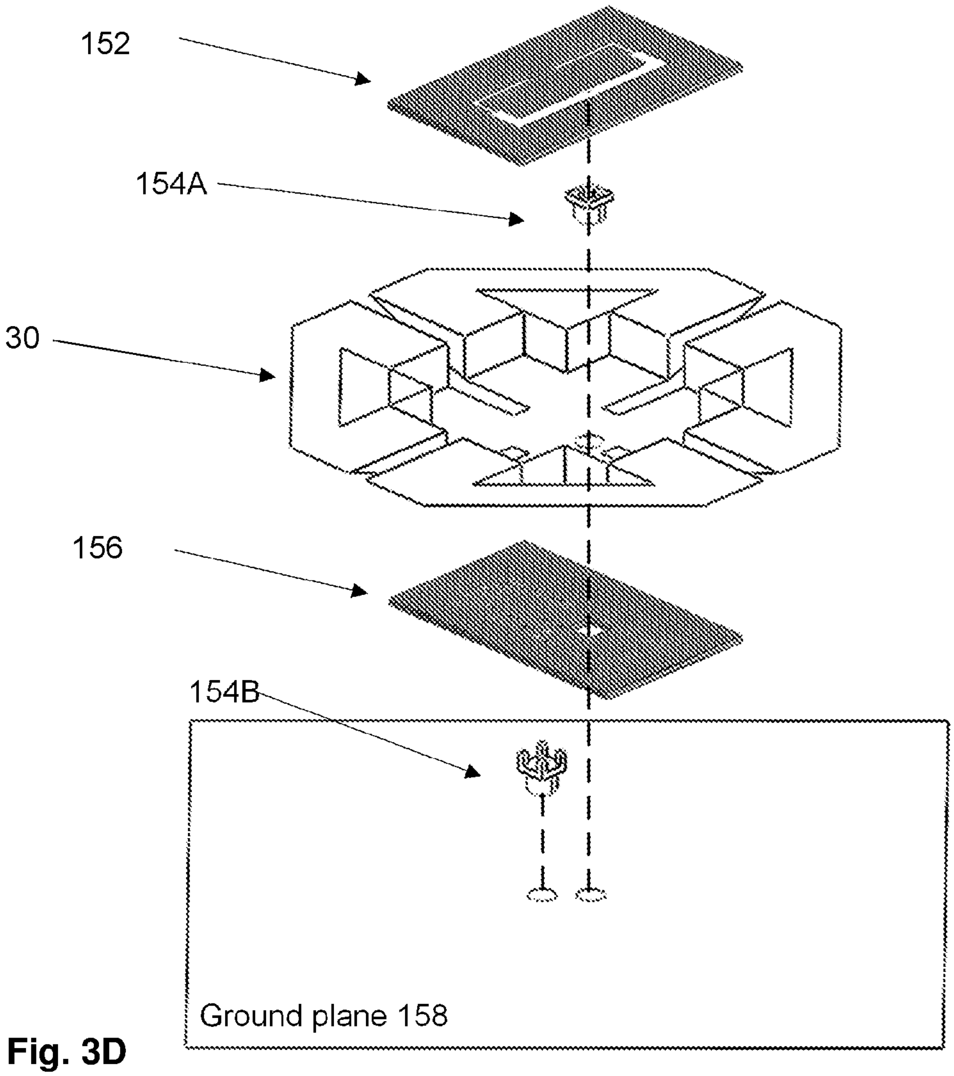
Fig. 3D

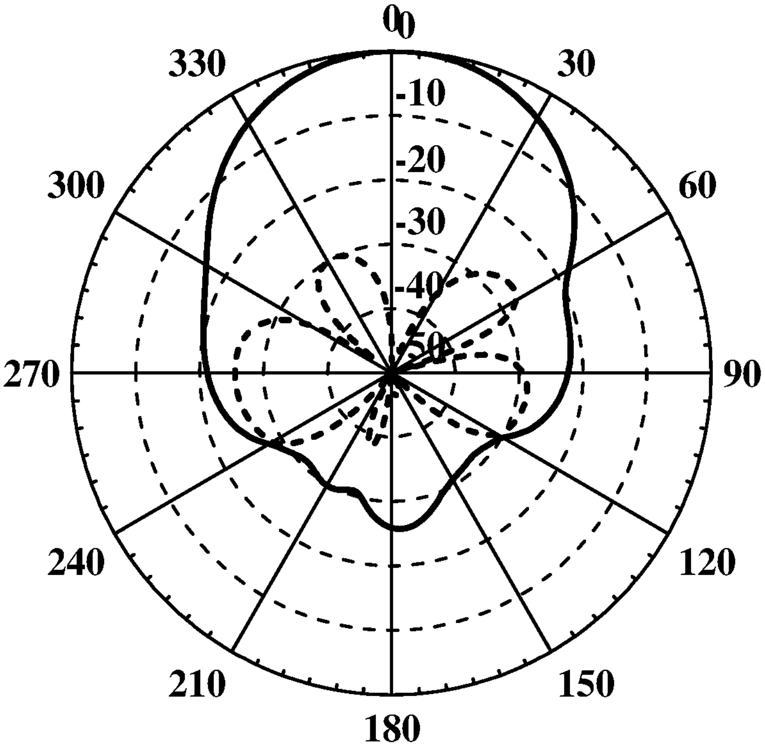
Fig. 4A1
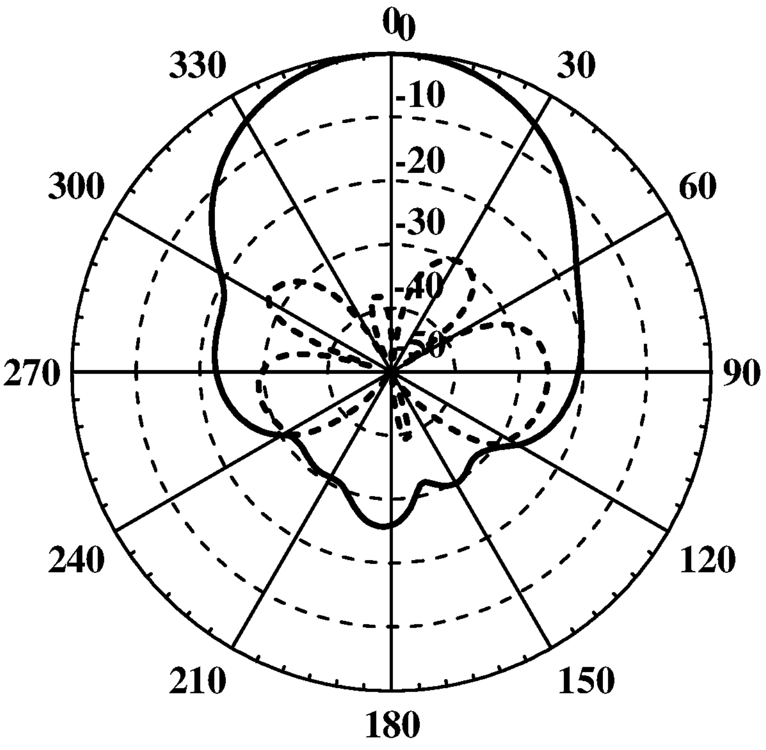
Fig. 4A2

Fig. 4B1
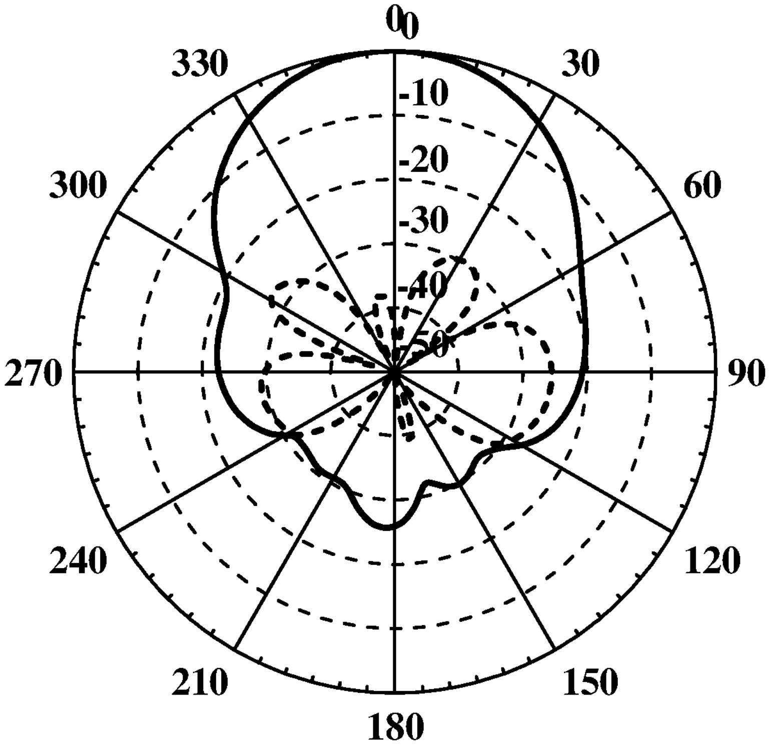
Fig. 4B2
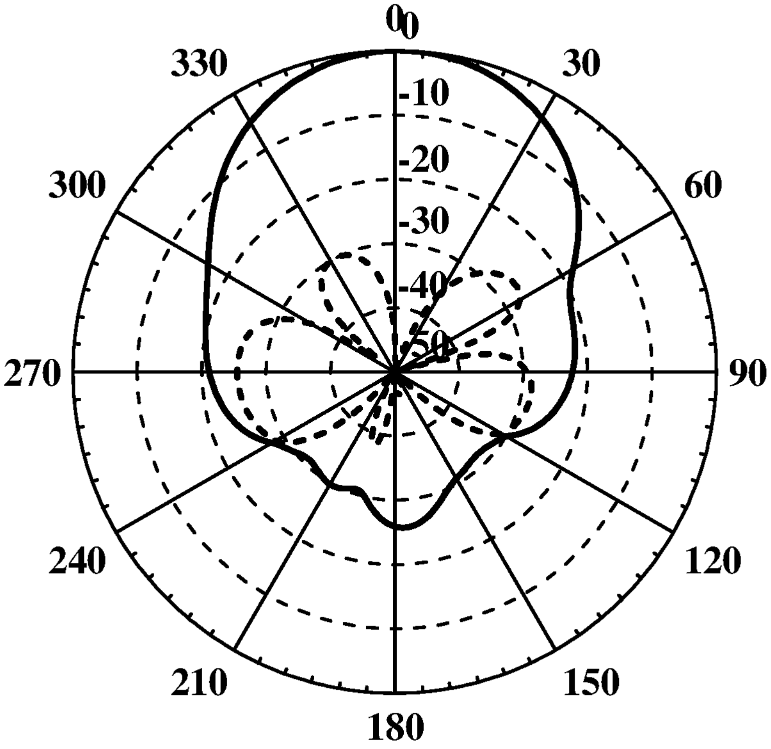

Frequency (GHz)

Frequency (GHz)

MAGNETO-ELECTRIC DIPOLE ANTENNA

CROSS-REFERENCE TO RELATED APPLICATIONS

This application is the U.S. national phase of International Application No. PCT/IB2020/058603 with an international filing date of Sep. 16, 2020, designating the U.S., and further claims priority benefits to Hong Kong Patent Application No. 32020002028.9 filed Jan. 24, 2020. The contents of all of the aforementioned applications, are incorporated herein by reference.

BACKGROUND

Technical Field

The present disclosure relates to antennas for radio-frequency telecommunications, and more particularly to magneto-electric (ME) dipole antennas including wideband complementary ME antennas.

Description of Related Art

With the rapid advancement in telecommunication technologies, for example the rapid deployment of 5th generation telecommunication networks worldwide, antennas which can facilitate high data rate throughput while having a compact physical size is highly desirable.

Electric dipole antennas ("electric dipole" in short) have a wide resistivity bandwidth but is disadvantaged by its high profile. Microstrip patch antennas have a low profile but is disadvantaged by its narrow bandwidth. Magneto-electric ("ME") dipole antennas are advantageous in having a wide resistivity bandwidth, a stable gain over a width range of operating frequencies and a stable beam-width over the operating frequencies, but are disadvantaged by its high profile.

ME dipole antennas having a low profile is advantageous.

SUMMARY

An antenna comprising a magneto-electric dipole or a plurality of magneto-electric dipoles, wherein the magneto-electric dipole is a composite dipole comprising an electric dipole and a magnetic dipole in electromagnetic coupling.

The magnetic dipole comprises a first magnetic patch portion and a second magnetic patch portion which are physically interconnected at a base portion and which cooperate to define a patch antenna having an inter-patch channel, the channel extending along a channel axis to define a channel length and having a channel width and a channel height.

The electric dipole comprises a plurality of planar portions including a first planar portion on which a first electric dipole portion is defined and a second planar portion on which a second electric dipole portion is defined, the first planar portion and the second planar portion having a first electrical conductivity of metal.

The electric dipole portion may be configured to define an electric signal current path having a width smaller than the channel length.

The planar portion may comprise a higher resistivity portion or a lower conductivity portion which defines a region of a second electrical conductivity, of non-metal or lower than metal, which is intermediate an electric dipole portion and the magnetic dipole.

The electric dipole antenna portion comprises a plurality of electric patch portions each defining a planar portion. Each electric patch portion comprises a first patch region of a first conductivity and a second patch region of a second conductivity lower than the first conductivity, wherein the first patch region and the second patch region cooperate to define an electrical current path of the dipole antenna portion.

BRIEF DESCRIPTION OF DRAWINGS

Aspects and embodiments of the present disclosure are described with reference to the accompanying figures, in which, FIG. 1 is a top plan view of an example antenna chassis 10 of the present disclosure, FIG. 1A is a side elevation view of an example composite ME antenna comprising an antenna chassis of FIG. 1 mounted with electronics and on a ground plate, FIG. 1B is a schematic diagram showing the antenna of FIG. 1A and electric and magnetic currents when excitation signals are applied to a signal port, FIG. 3C is a cross-sectional view of a complementary ME antenna formed with the example antenna chassis 30 of FIG. 3, FIG. 3D is an exploded view of a complementary ME antenna formed with the example antenna chassis 30 of FIG. 3, FIGS. 4A1 and 4A2 show example characteristic radiation patterns of the complementary antenna of FIG. 3D in two-orthogonal plane when excitation signals are applied to the antenna configuration of FIG. 3B1, FIGS. 4B1 and 4B2 show example characteristic radiation patterns of the complementary antenna of FIG. 3D in two-orthogonal plane when excitation signals are applied to the antenna configuration of FIG. 3B2.

DETAILED DESCRIPTION

Figure 2:
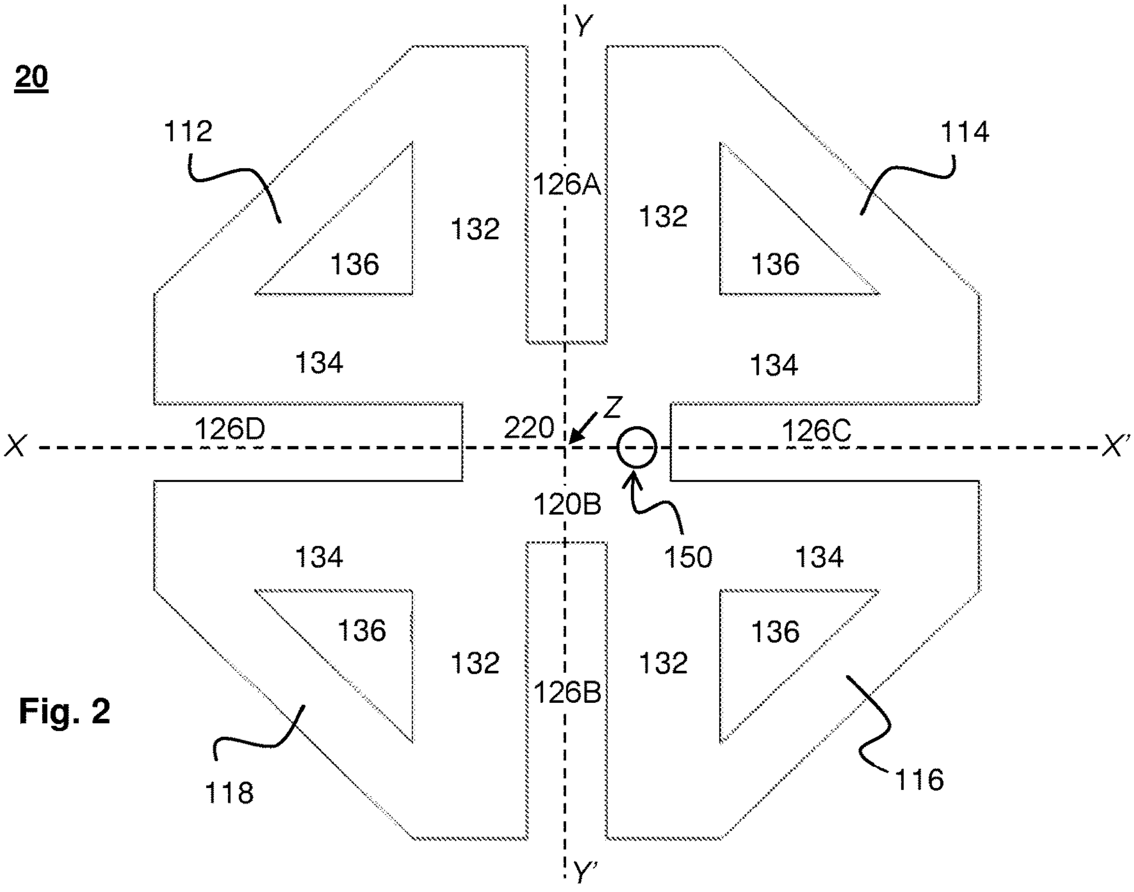
FIG. 2 is a top plan view of an example antenna chassis 20 of the present disclosure.

A magneto-electric (ME) dipole antenna is a composite antenna comprising a plurality of antenna portions, namely, a first antenna portion which is an electric dipole antenna portion and a second antenna portion which is a magnetic dipole antenna portion. The composite antenna comprises an electric dipole and a magnetic dipole which are configured for electromagnetic coupling, such that their radiation patterns in the E-plane and the H-plane are respectively additive and overlapping in the respective planes when subject to excitations. E-plane contains the electric field vector (sometimes called the E aperture) and the direction of maximum radiation. H-plane contains the magnetic field vector (sometimes called the H aperture) and the direction of maximum radiation. A composite antenna so configured is referred to as a complementary ME antenna.

The electric dipole antenna portion may comprise one electric dipole antenna (electric dipole in short) or a plurality of electric dipoles. The plurality of electric dipoles may be configured to form an ensemble of electric dipoles such as an array of electric dipoles in which the component dipoles have predetermined electric field relationships such as phase relationships. The magnetic dipole antenna portion may comprise one magnetic dipole antenna (magnetic dipole in short) or a plurality of magnetic dipoles. The plurality of magnetic dipoles may be configured to form an ensemble of magnetic dipoles such as an array of magnetic dipoles in which the component dipoles have predetermined magnetic field relationships such as phase relationships.

An electric dipole and a corresponding magnetic dipole are coupled to form an ME dipole pair. An ME antenna may comprise one ME dipole pair of a plurality of ME dipole pairs, wherein each ME dipole pair comprises an electric dipole and a corresponding magnetic dipole which cooperate to form a composite dipole pair.

The electric dipole and a magnetic dipole which cooperate to form a complementary ME antenna dipole pair are cooperatively coupled to form a composite antenna such that when the electric dipole and a magnetic dipole are excited simultaneously by cooperative excitation signals, radiation patterns with constructive or additive coupling in the E-plane and radiation patterns with constructive or additive coupling in the H-plane will result. The constructive coupling of radiation patterns confers an ME antenna with enhanced antenna performance.

An electric dipole antenna ("electric dipole" in short) has a radiation pattern in the E-plane (say Y-Z plane) resembling the shape of the number 8 and a pattern in the H-plane (say X-Z plane) resembling the shape of the number 0. A magnetic dipole antenna ("magnetic dipole" in short) has a radiation pattern in the E-plane resembling the shape of the number 0 and a pattern in the H-plane resembling the shape of the number 8.

In example embodiments, the electric dipole and the corresponding magnetic dipole forming a ME dipole are orthogonally disposed to attain maximal overlapping and combination of radiation patterns in the E-plane and radiation patterns in the H-plane by addition. In example embodiments, the electric dipole and the corresponding magnetic dipole are configured to have same resonant frequency.

An ME antenna may be configured such that when two excitation sources of equal amplitude and in-phase relationship are to apply simultaneously to the ME dipole, the resulting radiation patterns in the E-plane and the H-plane (which is orthogonal to the E-plane) are additive and identical, with back radiation suppressed, totally or substantially.

An ME dipole comprising an electric dipole and a corresponding magnetic dipole which is orthogonal to the electric dipole may be configured such that when the dipoles are excited simultaneously, the ME dipole has a unidirectional radiation pattern with equal E-plane and H-plane radiation patterns. For example, an ME dipole may be configured to have a cardiac-shaped radiation pattern, with identical and symmetrical radiation patterns in the E-plane and the H-plane, and notably a zero back-radiation.

An example ME dipole antenna according to the present disclosure comprises an electric dipole antenna and a magnetic dipole antenna which are coupled, that is, in electromagnetic field interconnection and/or in physical interconnection.

Referring to FIG. 1, an example ME antenna 10 comprises a magnetic antenna body which includes a first magnetic dipole portion 122, a second magnetic dipole portion 124, and a base portion 120 interconnecting the magnetic dipole portions 122, 124. The first magnetic dipole portion 122, the second magnetic dipole portion 124 and the base portion 120 cooperate to define a magnetic dipole antenna having a channel 126. The channel 126 extends along a channel axis between a first end which is a first longitudinal end that is proximal to the base portion 120 and a second end which is a second longitudinal end that is distal from the base portion 120. The base portion 120 interconnects the first magnetic dipole portion 122 and the second magnetic dipole portion 124 and comprises an upper surface and a bottom surface. In example configurations, the magnetic antenna body is mounted on a ground plate having a ground surface such that the bottom surface is in abutment or in proximity with the ground plane, as shown in FIG. 1A. When the antenna chassis of FIG. 1 is mounted on a ground surface, the bottom surface of the magnetic antenna body is intermediate the upper surface and the ground surface.

The first magnetic dipole portion 122 comprises a first wall which is a first sidewall having a first inner surface and the second magnetic dipole portion 124 comprises a second wall which is a second sidewall having a second inner surface which is opposite facing to the first inner surface. The first inner surface and the second inner surface cooperate to define the channel 126, and more specifically the channel sidewalls. The channel axis is a longitudinal center axis of the channel and the channel 126 projects away from the base portion 120.

In embodiments such as the example of FIG. 1, the channel axis is parallel to the first inner surface and the second inner surface. The channel 126 has a width W which is the physical separation between the first and second inner surfaces, measured in a direction orthogonal to the channel axis; a length L which is the longitudinal extent of the sidewalls, measured in a direction parallel to the channel axis; and a height which is an elevation distance with respect to the bottom surface of the base portion, measured in a direction orthogonal to the bottom surface of the base portion 120.

The channel 126 has an upper end which is an open end and a lower end which cooperates with the upper end to define the height of the channel. The open end is defined by cooperation of the upper ends of the first wall and the second wall. The channel defines a cavity, or more specifically a magnetic cavity, which extends between the upper end, the lower end, the first longitudinal end and the second longitudinal end.

In example embodiments where the antenna chassis is mounted on a ground surface, the lower end of the channel may be a closed end which is closed by the ground surface, and the ground surface, which is a conductive surface extending between and/or interconnecting the sidewalls of the channel, becomes the bottom surface of the channel.

The sidewall may have a uniform height or a non-uniform height along the axial direction of the channel 126. The sidewall of the example antenna chassis has a maximum height at the first longitudinal end of the channel and a minimum height at the second longitudinal end. The sidewall may have a height which gradually or linearly decreases on extending away from the first longitudinal end or and/or extending towards the second longitudinal end. In example embodiments, the example sidewall has a height which is equal to the thickness of the electric dipole portion at the second longitudinal end. In example embodiments, the sidewall has the shape of a right-angled triangle in which a vertex of the triangle distal from the right angle is at the second longitudinal end.

In example embodiments, the sidewall is a metallic wall, for example, a metallic wall of a metal plate such as a metal plate of uniform thickness, which abuts the base portion 120 and projects orthogonally therefrom to define an upper end of the channel.

In example embodiments, the sidewalls of the channel 126 and the base portion 120 are integrally formed, for example, from a single metal plate such as a copper plate or a galvanized plate. In example embodiments, the sidewalls are parallel to the channel axis which is a center axis dividing the channel into two equal lateral halves. Each one of the first inner surface, the second inner surface, and the bottom surface of the channel is typically a planar surface. The first inner surface and the second inner surface are typically configured to be parallel to each other and orthogonal to the bottom surface so that the channel has a rectangular, including substantially rectangular, cross-section, with the channel axis coaxial with the longitudinal center axis of a rectangle, where the cross-section is a section taken parallel to the bottom surface.

Referring to FIG. 1, the electric dipole antenna comprises a first electric dipole portion 112 and a second electric dipole portion 114 which are on two lateral sides of the magnetic dipole. The first electric dipole portion 112 is on a first planar portion of the electric dipole antenna, the second electric dipole portion 114 is on a second planar portion of the electric dipole antenna, and the first planar portion and the second planar portion of the electric dipole antenna are interconnected by the magnetic dipole, or more specifically by the channel of the magnetic dipole.

The electric dipole is spaced apart from the base portion 120. More specifically, the electric dipole is elevated from the base portion 120, for example, by the sidewalls of channel and is parallel to the bottom surface of the base portion 120 or the channel 126. In example embodiments, the electric dipole abuts the open upper end of the channel 126 such that the cavity of the magnetic dipole is intermediate the first electric dipole portion 112 and the second electric dipole portion 114.

In example embodiments, the electric dipole portion 112, 114 is a planar portion which is parallel to the ground surface, and the separation distance between the electric dipole and the base portion is equal to the height of the channel. In example embodiments, the planar portion of the electric dipole portion 112, 114 and the upper end of the channel 126 are at the same elevation level above the base portion 120, the elevation level being measured in a direction orthogonal to the bottom surface of the base portion 120.

In example embodiments, the first electric dipole portion 112 and the second electric dipole portion 114 are configured to function as a half-wavelength dipole, for example, a planar half-wavelength dipole. When configured as a half-wavelength dipole, each electric dipole portion 112, 114 is to effectively contribute as a quarter-wavelength dipole.

The first planar portion of the electric dipole antenna, comprising the portions 112, 132, 134, 136, and the second planar portion of the electric dipole antenna, comprising the portions 114, 132, 134, 136, are disposed on two lateral sides of the channel axis. In example embodiments, the first planar portion and the second planar portion are mirror symmetrically about the channel axis.

The planar portion includes the electric dipole portion 112, 114 and an intermediate portion which is intermediate the channel 126 and the electric dipole portion 112, 114. The intermediate portion is intermediate the electric dipole portion 112, 114 and the magnetic dipole antenna and interconnects the channel 126 and the electric dipole portion 112, 114. In example embodiments, the intermediate portion interconnects the upper end of the channel and the electric dipole portion 112, 114 such that the electric dipole portion 112, 114 extends away from the magnetic dipole antenna and projects to overhang a portion of the ground surface.

The example intermediate portion comprises a first wing portion 132 which abuts a first end of the electric dipole portion 112, 114; a second wing portion 134 which abuts a second end of the electric dipole portion 112, 114; a third wing portion on which the electric dipole portion 112, 114 is defined, and a fourth wing portion 136 which is in abutment with the first wing portion 132, the second wing portion 134, and the third wing portion. The third wing portion has a first end which defines a first end of the electric dipole portion 112, 114 and a second end which defines a second end of the electric dipole portion 112, 114. The fourth wing portion 136 has a first end which is in abutment with the first end of the third wing portion and a second end which is in abutment with the second end of the third wing portion.

The first end of the electric dipole portion 112, 114 is proximal to the channel and distal from the base portion, the second end is proximal to the base portion and distal from the channel, and the first end and the second end cooperate to define a direction of extension of the electric dipole portion 112, 114. The fourth wing portion 136 has a boundary which is delimited by cooperation of the first wing portion, the second wing portion, and the third wing portion (or more specifically the electric dipole portion 112, 114). More specifically, each of the first wing portion, the second wing portion, and the electric dipole portion 112, 114 has an interior boundary and the interior boundaries of the first wing portion, the second wing portion, and the electric dipole portion 112, 114 cooperate to define and delimit the external boundary of the fourth wing portion 136.

The electric dipole portion 112, 114 is a highly conductive portion which is made of a highly conductive material such as copper, for example, a copper plate, so that electric radio-frequency (RF) signal current can flow freely and substantially unimpeded along an electric current path. The electric current path and the direction of electric signal current flow are defined by the shape and configuration of the third wing portion, and more specifically by the width and direction of extension of the electric dipole portion 112, 114. The fourth wing portion is a high resistivity portion or a higher impedance portion which is configured to impede flow of electric current therethrough. The electric dipole portion 112, 114 and the fourth wing portion are in parallel connection between the first end and the second end and have a resistivity relationship or conductivity relationship such that electric current flowing from the first end of the electric dipole portion 112, 114 to the second end of the electric dipole portion 112, 114 will prefer to flow through the electric dipole portion 112, 114 and not or substantially not through the fourth wing portion 136. The resistivity ratio between the fourth wing portion and the electric dipole portion 112, 114 is for example, at 10 or higher, for example, at 20, 50, 100, 1,000, 10,000 or higher to facilitate the electric signal current preference.

In example embodiments, the fourth wing portion 136 is an aperture defined on the planar portion of the electric dipole antenna which contains the electric dipole portion 112, 114. When the fourth wing portion 136 is an aperture, the fourth wing portion 136 is a region having the resistivity or conductivity of air or free space, and the electric dipole portion 112, 114 is a region having the resistivity or conductivity of metal, such as gold, silver, copper or steel.

In example embodiments, the first wing portion 132, the second wing portion 134, and the third wing portion comprising the electric dipole portion 112, 114 comprise planar portions which are integrally formed and cooperate to define and surround the fourth wing portion 136. The planar portion comprises an upper planar surface which has a sane facing orientation as the upper surface of the base portion 120.

In example embodiments, the first wing portion 132 extends in an axial direction which is parallel to the channel, the second wing portion 134 extends in a transverse direction which is orthogonal to the channel, and the electric dipole portion 112, 114 extends at an acute angle with respect to the channel 126, as shown in FIG. 1. The example fourth wing portion 136 of FIG. 1 has a triangular boundary defined by a right-angled triangle which is defined by the first wing portion 132, the second wing portion 134, and the electric dipole portion 112, 114 in cooperation. The angle of extension of the electric dipole portion 112, 114 is less than 90 degrees, for example, between 30 and 60 degrees, including 45 degrees.

Referring to FIG. 1, the first wing portion 132 is intermediate and interconnects the electric dipole portion 112, 114 and the magnetic dipole. More specifically, the first wing portion 132 abuts the sidewall of the channel and extends orthogonally away from the sidewall to connect with the electric dipole portion 112, 114 and the region of high electrical resistivity. The first wing portion 132 has a first lateral side which is in abutment with the sidewall and a second lateral side which is in abutment with both the electric dipole portion 112, 114 and the region of high electrical resistivity. The first lateral side of the first wing portion 132 has a first length which is in abutment with the magnetic dipole, for example, with the upper end of the magnetic dipole. The upper end of the magnetic dipole is also the upper end of the channel 126, which is flush with the upper planar surface of the first wing portion. The second lateral side has a second length which is in abutment with the electric dipole portion 112, 114 and a third length which is in abutment with the region of high electrical resistivity.

In some embodiments, the first length equals the length of the channel, and is substantially larger than the second length. For example, the sum of the second length and the third length may equal the first length. In some embodiments, the third length is substantially longer than the second length and the junction between the first wing portion 132 and the electric dipole portion 112, 114 has a junction width which is substantially smaller than the length of the channel. For example, the junction width, measured in a direction parallel to the channel axis, may be less than ¾, ½, ⅓ the length of the channel. Substantially herein means a difference of more than 20%, 25%, 30%, 35%, 40%, 50%, 60%, 70% or more. The electric dipole portion 112, 114 has an outer edge and an inner edge which cooperate to define a width, and the width is smaller than the junction width.

The second wing portion 134 comprises a planar portion having an upper planar surface, a first side which is an inner side in abutment with the region of high resistivity 136, and a second side which is an outer side distal from the region 136. A downwardly dependent sidewall 138 extends downwardly from the upper planar surface of the second wing portion 134. The sidewall 138 has a first edge which is in abutment with the base portion 120 and a second edge which is distal from the base portion 120. The first edge of the sidewall has a first length which is approximately equal to the channel height and the second edge of the sidewall has a second length which is shorter than the first length. The length of the sidewall 138 gradually decreases on extending away from the base portion so that the sidewall 138 is elevated above the base portion 120 except at the first edge. In the example embodiment, the sidewall 138 has the shape of a right-angled triangle and the second edge of the sidewall 138 is at the same elevation level as the upper planar surface and has the same thickness as the planar portion of the second wing portion which is in abutment with the planar electric dipole portion 112, 114, as shown in FIG. 1A. The sidewall 138 has a shape and configuration which is substantially identical to the sidewall 122,124 of the channel 126. The description in relation to the sidewall 138 is to apply mutatis mutandis to the sidewall 122, 124 and vice versa.

In some embodiments, the second wing portion 134 may be absent so that the second end of the electric dipole portion 112, 114 is a free end and the electric dipole portion 112, 114 is cantilevered from the first wing portion 132.

In example embodiments, the first wing portion 132 and the fourth wing portion comprising the electric dipole portion 112, 114 are integrally formed of same conductive material, for example, a metallic plate, to enhance reliability and robustness.

Therefore, the planar portion of the electric dipole, which is the portion of the electric dipole on which the electric dipole portion 112, 114 is formed, comprises a region of high electrical conductivity (or low electrical resistivity) and a region of low electrical conductivity (or high electrical resistivity). The region of high electrical resistivity is intermediate the region of high electrical conductivity and the magnetic dipole antenna. More specifically, the region of high electrical resistivity 136 is intermediate the base portion 120 and the electric dipole portion 112, 114, which is in a region of high electrical conductivity.

In some embodiments, the region of high electrical resistivity 136 may be filled or occupied by a substrate instead of air, and the substrate has a substantially lower electrical conductivity than the electric dipole portion 112, 114.

Referring to FIG. 1A, the antenna chassis, comprising the electric dipole antenna body and the magnetic dipole antenna body, is mounted on a ground plate which defines a ground plane. The base portion of the antenna chassis is electrically connected to the ground plate so that the ground plate serves as a reference ground of the composite antenna. The ground plate has a footprint which is comparable to, that is, slightly smaller than, equal to, or slightly larger than the footprint of the electric dipole. Footprint herein is a projection made in a direction orthogonal to the bottom surface. Electronic circuitry 140 of the composite antenna, for example, excitation circuitry and/or receiver circuitry, is mounted on the base portion 120.

The example magnetic dipole antenna is configured as a patch antenna, specifically, a shorted patch antenna, and more specifically, a shorted quarter-wave patch antenna. From classical cavity model theories, the radiation of a shorted patch antenna is mainly from the open end and radiates as a magnetic current. A typical shorted quarter-wave patch antenna has an effective height of a quarter wavelength.

The example electric dipole antenna is configured as a planar electric dipole, comprising a planar first electric dipole portion 112 and a planer second electric dipole portion 114. The planar electric dipole portion 112, 114 has an outer end which is distal from the magnetic dipole and an inner end which is proximal to the magnetic dipole. The inner and outer ends of the example electric dipole portion 112, 114 are shorted to the ground plane.

When magnetic and electric excitations are applied to the composite antenna, magnetic field (dotted arrow) is generated on the magnetic dipole (M-dipole) and electric current is generated on the electric dipole (E-dipole), as depicted in FIG. 1B.

Referring to FIGS. 1, 1A, and 1B, the first electric dipole portion 112 and extends at a first angle $\alpha$ with respect to the channel axis and the second electric dipole portion 114 extends at a second angle $\beta$ with respect to the channel axis. The first angle is a positive (counterclockwise) acute angle with respect to the channel axis while the second angle is a negative (clockwise) acute angle with respect to the channel axis. In the example, the angles $\alpha$ and $\beta$ are equal. The example electric dipole portion 112, 114 is elongate and extends along a longitudinal axis between a first longitudinal end which is a first end distal from the base portion 120 and a second longitudinal end which is a second end proximal to the base portion 120. The direction of extension of the electric dipole portion 112, 114 determines the direction of flow of electric current on the electric dipole portion 112, 114, as shown in FIG. 1B.

A composite antenna according to the disclosure has improved antenna performance compared to that of a conventional ME antenna having comparable configurations. A conventional ME antenna has electric dipole portions in which the electric dipole portion has a width which is the same as the channel length L and in which the electric dipole portion extends away from the channel at a right angle to the channel axis. The width of the electric dipole portion defines the width of the electric current path and is measured in a direction orthogonal to the direction of the electric current.

A composite antenna according to the present disclosure has a plurality, notably an even number, of electric dipole portions each having an electric current path which is narrower than the length of the channel of the corresponding magnetic dipole.

A composite antenna according to the present disclosure has an antenna chassis comprising a first planar portion on a first side of the channel of a magnetic dipole, a second planar portion on a second side of the channel such that the channel is intermediate the first and second planar portions. The first planar portion comprises a first electric dipole portion and a first region of higher electric resistivity which is intermediate the first electric dipole portion and the channel. The second planar portion comprises a second electric dipole portion and a second region of higher electric resistivity which is intermediate the second electric dipole portion and the channel. In other words, the first region and the second region of higher electric resistivity are intermediate the first electric dipole portion and the electric dipole portion and are at same axial level as the first electric dipole portion and the electric dipole portion, the axial level being measured in a direction orthogonal to the base portion. In some embodiments, the region of higher electric resistivity is surrounded by a region of high electric conductivity and the electric dipole portion is defined on the region of high electric conductivity.

A composite antenna according to the present disclosure has a plurality of electric dipole portions each having an electric current path extending at a non-right angle to the length of the channel, the length of the channel being measured in a direction parallel to the channel axis.

The electric dipole portion may be connected to the sidewall of the channel via an intermediate portion or may be connected to the sidewall of the channel directly without an intermediate portion. Where the electric dipole portion is connected directly to the sidewall of the channel, the sidewall and the electric dipole portion are in physical abutment.

A composite ME antenna has electric dipole portions each having an electric current path projecting at an elevation distance above the bottom surface, the elevation distance being measured in a direction orthogonal to the bottom surface of the channel. A composite ME antenna according to the disclosure may have its electric current paths projecting at an elevation distance of less than a quarter wavelength above the bottom surface for enhanced compactness while maintaining the same performance of a conventional ME antenna having a wider electric dipole portion.

It is noted that a composite ME antenna in which the electric dipole portion has a width which is substantially smaller than the length of the channel has enhanced antenna performance compared to a conventional ME antenna of same height above the ground plate.

As same or better antenna performance can be achieved by a lower height of the electric dipole, a composite ME antenna according to the present disclosure has a lower profile than conventional ME antennas and is more compact.

An example ME antenna chassis 20 comprises a first planar portion on which a first electric dipole portion 112 is defined, a second planar portion on which a second electric dipole portion 114 is defined, a third planar portion on which a third electric dipole portion 116 is defined, and a fourth planar portion on which a fourth electric dipole portion 118 is defined. The planar portions of the ME antenna chassis 20 are interconnected by an interconnection base portion 220, as shown in FIG. 2.

The example ME antenna 20 comprises a first channel 126A which interconnects the first planar portion and the second planar portion, a second channel 126B which interconnects the third planar portion and the fourth planar portion, a third channel 126C which interconnects the second planar portion and the third planar portion, and a fourth channel 126D which interconnects the first planar portion and the fourth planar portion. The interconnection base portion 220 has a length, measured in a direction parallel to the channel axis of the first channel or the axis Y-Y', which is equal to the widths of the third channel and the fourth channel.

Each planar portion comprises a first wing portion 132, a second wing portion 134, a fourth wing portion 136, and an electric dipole portion 112, 114, 116, 118.

The first planar portion, the second planar portion, and the first channel 126A have same features, relationship and description of the antenna chassis of FIG. 1 and features, relationship and description are incorporated herein by reference.

The third planar portion, the fourth planar portion, and the second channel 126B are a mirror symmetrical image or copy, respectively, of the first planar portion, the second planar portion and the first channel 126A about an axis X-X'.

The base portion 220 has features, relationship and description of the base portion 120 of the antenna chassis of FIG. 1 and features, relationship and description of the base portion 120 are incorporated herein by reference. The base portion 220 comprises a first base portion 120A which interconnects the first planar portion and the second planar portion, and a second base portion 120B which interconnects the third planar portion and the fourth planar portion.

The first antenna chassis portion of the ME antenna chassis 20, comprising the first planar portion, the second planar portion, the first base portion 120A and the first channel portion 126A, is identical to the antenna chassis of FIG. 1.

The second antenna chassis portion of the ME antenna chassis 20, comprising the third planar portion, the fourth planar portion, the second base portion 120B and the second channel portion 126B, is a mirror symmetrical copy of the antenna chassis of FIG. 1 about the axis X-X', which is an axis of symmetry.

Referring to FIG. 2, the second planar portion and the third planar portion cooperate to define the third channel 126C while the third planar portion and the fourth planar portion cooperate to define the fourth channel 126D. More specifically, the second wing portions 134 of the second planar portion and the third planar portion cooperate to define the third channel 126C and the second wing portions 134 of the third planar portion and the fourth planar portion cooperate to define the fourth channel 126D.

To facilitate formation of a magnetic dipole by cooperation of the second wing portions 134 of adjacent second planar portions, the second wing portion 134 comprises a downwardly dependent sidewall similar to the sidewall 122, 124 of the first wing portions, and the sidewalls are shorted to the base portion to define a channel 126C, 126D of an ME antenna.

In the example of FIG. 2, the first planar portion and the second planar portion are mirror symmetrical about an axis Y-Y', and the third planar portion and the fourth planar portion are mirror symmetrical about the axis Y-Y'. The axis X-X' is coaxial with the channel axes of the channels 126A and 126B while the axis Y-Y' is coaxial with the channel axes of the channels 126C and 126D. The axis X-X' and the axis Y-Y' intersects at a center Z of the base portion and the planar portions of the antenna chassis 20 are distributed at uniform angular spacing with respect to the center Z.

The antenna chassis is configured such that the planar portion which is in abutment with the magnetic dipole comprises a region of higher electrical resistivity which is intermediate the magnetic dipole and the electric dipole portion 112, 114, 116, 118. More specifically, the region of higher electrical resistivity is at same axial level as the planar portion on which the electric dipole portion 112, 114, 116, 118 is defined, the axial level measured in the direction of the Z-axis, which is an axis orthogonal to the base portion 120. In example embodiments, the electric dipole portion 112, 114, 116, 118 and the region of higher electrical resistivity are at same axial level as the upper end of the channel 126. Referring to FIG. 2, the region of higher electrical resistivity 136 is intermediate the center axis, i.e., Z-axis, of the base portion 120 and the third wing portion, which is part of the planar portion on which the electric dipole portion 112, 114, 116, 118 is defined. The region of high electrical resistivity 136 and the electric dipole portion 112, 114, 116, 118 are distributed in a radial direction away from the center axis (Z-axis) and are at the same axial level with respect to the base portion.

In example embodiments, the fourth wing portion is an air aperture. Air has a conductivity of ~10−15 to 10−9 S/m (a resistivity of 109 to 1015 Ωm) and copper has a conductivity of 5.96×107 S/m (a resistivity of 1.68×10−8 Ωm).

By having on the planar portion on which the electric dipole portion 112, 114, 116, 118 is defined a region of higher resistivity (lower conductivity) intermediate a region of higher conductivity (lower resistivity) and the magnetic dipole, the electric current path of the electric dipole can be configured.

In general, a difference in conductivity or resistivity of 100 times and higher would be a substantially high difference which would be sufficient to produce a notable effect in current path configuration. While the region of higher resistivity in the example embodiment is an air aperture, this region may be filled with or occupied by a substrate having a resistivity between air and metal without loss of generality.

In use, the ME antenna chassis 20 may be mounted on a ground plate and electronic circuitry comprising operation electronics is mounted on the base portion 220, and the description in relation to the ME antenna chassis 10 in this regard is incorporated by reference and is to apply mutatis mutandis.

Figure 2A:
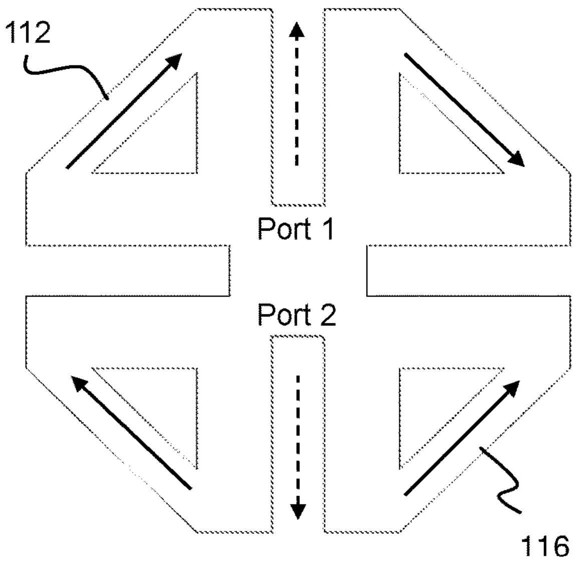
FIG. 2A is a schematic diagram showing the antenna of FIG. 2 and electric and magnetic currents when excitation signals are applied to a first set of signal ports.

In a first example configuration, the first planar portion, the second planar portion and the first channel 126A are configured to cooperate to form a first ME antenna portion; and the third planar portion, the fourth planar portions and the second channel 126B are configured to cooperate to form a second ME antenna portion. When in this first example configuration, the electronic circuitry may be configured such that a first antenna excitation signal (excitation signals in short) is applied to the first channel 126A via a first signal port (Port 1) and a second excitation signal is applied to the second channel 126B via a second signal port (Port 2), as shown in FIG. 2A. When ports 1 and 2 are excited with signals of same phase, the first and second ME antenna portions are complementary ME antenna portions which cooperate to form a complementary ME antenna having a first polarization angle, say a, for example, +45 degrees polarizations.

Figure 2B:
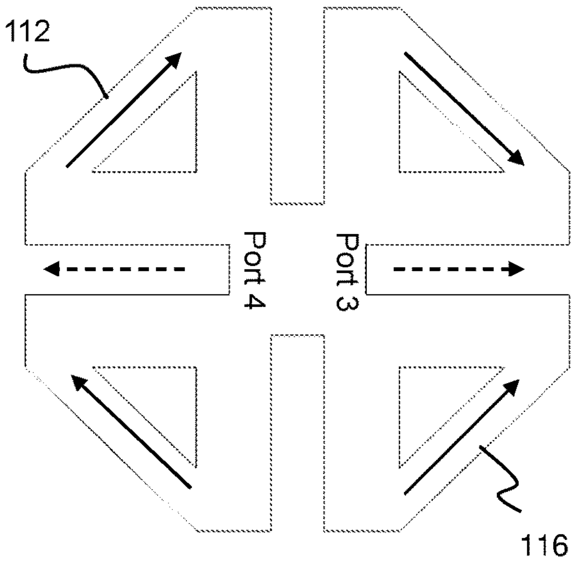
FIG. 2B is a schematic diagram showing the antenna of FIG. 2 and electric and magnetic currents when excitation signals are applied to a second set of signal ports.

In a second example configuration, the second planar portion, the third planar portion and the third channel 126C are configured to cooperate to form a first ME antenna portion; and the fourth planar portion, the first planar portion and the fourth channel 126D are configured to cooperate to form a second ME antenna portion. When in this second example configuration, the electronic circuitry may be configured such that a third antenna excitation signal (excitation signals in short) is applied to the third channel 126C via a third signal port (Port 3) and a fourth excitation signal is applied to the fourth channel 126D via a fourth signal port (Port 4), as shown in FIG. 2B. When ports 3 and 4 are excited with signals of same phase, the first and second ME antenna portions are complementary ME antenna portions which cooperate to form a complementary ME antenna having a second polarization angle, say $-\alpha$, for example, −45 degrees polarizations.

The composite ME antenna may be configured to have radiation patterns having dual polarization, for example, by alternately operating in the first and second example configurations without loss of generality.

Figure 2C:
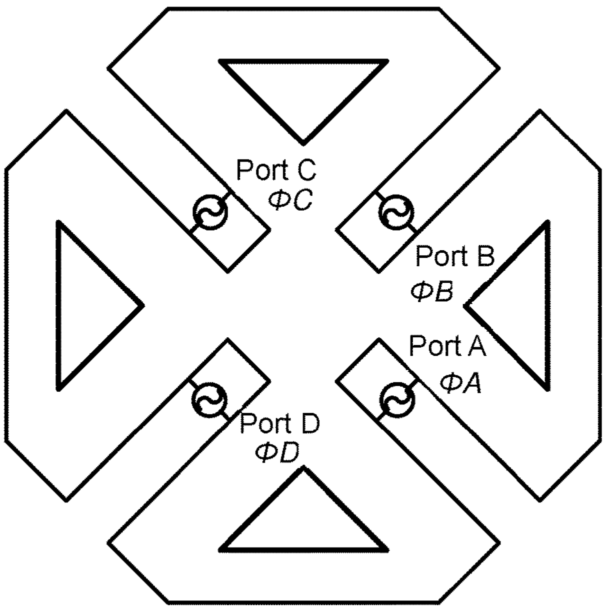
FIG. 2C is a schematic diagram showing the antenna of FIG. 2 and electric and magnetic currents when excitation signals are applied to a third set of signal ports.

The composite ME antenna may be configured as a circular polarized antenna, as shown in FIG. 2C. For example, the ME antenna may be configured as a left hand circular polarized (LHCP) antenna by setting φB−φA=φC−φB=φD−φC=+90°, wherein φA, φB, φC, φD are the phases of the excitation signals applied to port A, port B, port C and port D, respectively. The ME antenna may be configured as a right hand circular polarized (RHCP) antenna by setting φB−φA=φC−φB=φD−φC=−90°.

Techniques of feeding excitation signals into an ME antenna are described, for example, in Handbook of Antenna Technologies, 2016, Springer, ISBN 978-981-4560-44-3, which is incorporated herein by reference.

Figure 3:
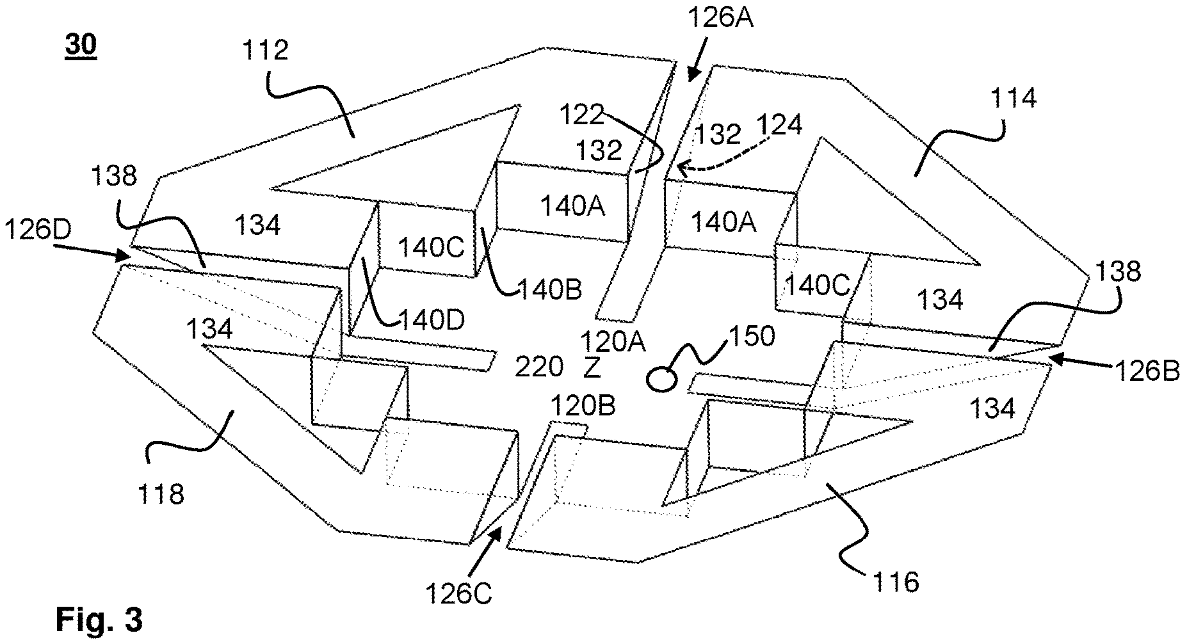
FIG. 3 is a top perspective view of an example antenna chassis 30 of the present disclosure.
Figure 3A:
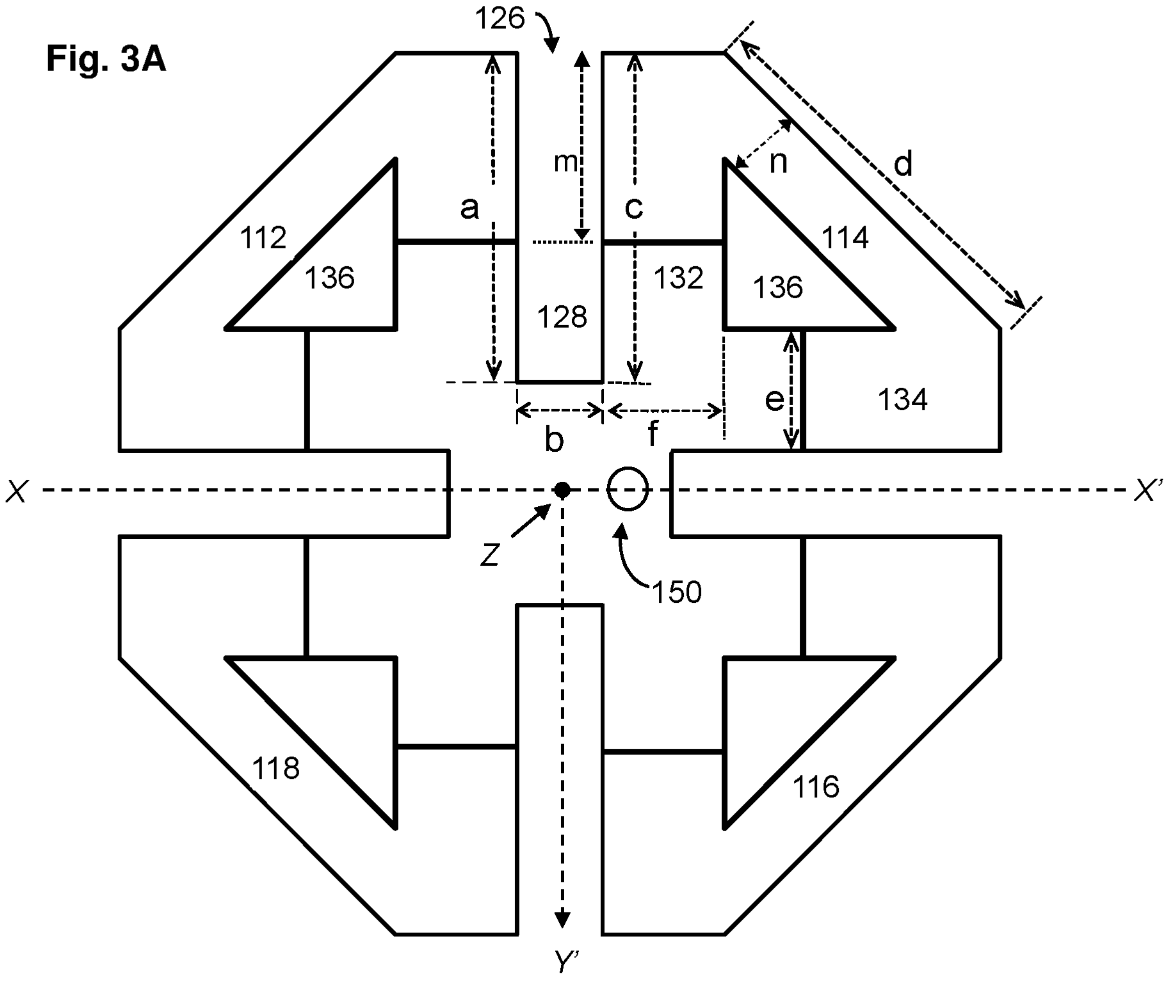
FIG. 3A is a top plan view of the example antenna chassis 30 of FIG. 3, FIGS. 3B1 and 3B2 are top plan views of the example antenna chassis 30 of FIG. 3 with antenna electronics mounted on a PCB and with the PCB mounted on the antenna chassis 30.

An example ME antenna chassis 30 as shown in FIGS. 3 and 3A comprises a basic structure of the antenna chassis 20. The features and the description in relation to the antenna chassis 20 are incorporated herein by reference.

The antenna chassis 30 comprises an inner peripheral wall 140 which extends to surround the base portion 220 to define a main compartment. The compartment has a height which is approximately equal to the height of the channel 126, the height being measured in a Z direction orthogonal to the upper surface of the base portion. A slot 128 which is coaxial with the channel 126 is formed on the base portion. The slot 128 abuts with the channel 126 to form a continuous slot which extends radially outwards from the base portion. A signal feeding aperture 150 is formed on the base portion 220 near an end of the slot which is an extension of the channel 126C.

The continuous slot has a total slot length a of which m is the length of the channel and a width b which is the same as the width W of the channel in this example. The slot provides physical and electrical separation between adjacent planar portions. The first wing portion has a width f, measured in a direction orthogonal to the axis Y-Y' of the abutting channel. The second wing portion has a width e, measured in a direction orthogonal to the axis X-X' of the abutting channel. The third wing portion has a length d, measured along a longitudinal axis which extends between the first and second longitudinal ends of the electric dipole portion 112, 114, 116, 118, and a width n, measured in a direction orthogonal to the longitudinal axis which is at angle α or β to the axis Y-Y'.

The dimension I1 of the total slot length a can be expressed as $I1=0.29\lambda_g+\Delta I$, where $-0.1\lambda_g\leq\Delta I\leq+0.1\lambda_g$.

The dimension I2 of the channel length m can be expressed as $I2=0.18\lambda_g+\Delta I$, where $-0.1\lambda_g\leq\Delta I\leq+0.1\lambda_g$.

The dimension I3 of the length d of the electric dipole portion 112, 114, 116, 118 can be expressed as $I3=0.35\lambda_g+\Delta I$, where $-0.15\lambda_g\leq\Delta I\leq+0.15\lambda_g$.

The dimension w1 of the width e of the second wing portion 134 can be expressed as $w1=0.1\lambda_g+\Delta I$, where $-0.05\lambda_g\leq\Delta I\leq+0.05\lambda_g$.

The dimension w2 of the width d of the electric dipole portion 112, 114, 116, 118 can be expressed as $w2=0.06\lambda_g+\Delta I$, where $-0.03\lambda_g\leq\Delta I\leq+0.03\lambda_g$.

The dimension s of the width b of the channel can be expressed as $s=0.03\lambda_g+\Delta I$, where $-0.02\lambda_g\leq\Delta I\leq+0.02\lambda_g$.

In addition, $2I1+s=0.6\lambda_g+\Delta I$, where $-0.2\lambda_g\leq\Delta I\leq+0.2\lambda_g$.

$\lambda_g$ is the wavelength at center frequency in waveguide substrate. Where the waveguide substrate is air, $\lambda_g=\lambda_0$.

The dimensions I1 and I2 cooperate to determine the working frequency of the antenna, w1, w2, and b determines resistivity matching.

The antenna chassis 30 comprises a main compartment for receiving the antenna electronics. The main compartment is defined by an inner peripheral wall in cooperation with the base portion, comprising the portions 120A, 120B and 220. As shown in FIG. 3, the inner peripheral wall, comprising the inner peripheral wall portions 140A, 140B, 140C, 140D, extends between the base portion and the top planar surface of the planar portions to define the height of the compartment. In example embodiments such as that of FIG. 3, the inner peripheral wall portion 140A, 140B, 140C, 140D has an inner surface which is parallel to the z-axis and is vertically oriented when the ground surface is horizontal. The height of the antenna is substantially equal to or slightly less than the height of the channels due to the thickness of the base portion.

The antenna electronics are mounted on a printed circuit board (PCB), as shown in FIGS. 3B1 and 3B2. The PCB 152 is mounted on the base portion and is received inside the antenna compartment, with a radio-frequency (RF) connector 154, for example, an SMA connector, connected to the PCB and extending through the base portion and the ground plate which is mounted underneath the antenna chassis 30.

The ME antenna chassis 30 when assembled with the antenna electronics is mounted on a ground plate 158 to form a complementary ME antenna. The ME antenna has a height h which is substantially contributed by the height of the ME antenna chassis, as shown in FIG. 3C. The height is measured between the planar surface of the electric dipole portion 112, 114, 116, 118 and the upper surface of the ground plate, and has a typical range of $0.05\lambda_0\leq h\leq 0.2\lambda_0$ and a typical height is $0.087\lambda_0$, which is less than 50% or less than 40% of the height of a conventional quarter-wavelength ME antenna. The height h of the antenna is substantially smaller than the height of a conventional quarter-wavelength ME antennas, and the complementary ME antennas has a low profile and is substantially more compact than conventional ME antennas.

In example configurations such as those shown in FIGS. 3B1 and 3B2, excitation signals are to be applied to a single input port of the complementary ME antenna via the RF connector. The PCB comprises a feed which is configured to feed excitation signals received from the single feeding port to excite two ports of the antenna chassis 30. For example, the RF connector 154 may be connected to a single feeding port, which is an input port proximal to the third channel 126C or the fourth channel 126D and the received excitation signals are fed to port 1 of the first channel 126A and port 2 of the opposite second channel 126B, as shown in FIG. 3B1. For example, the RF connector 154 may be connected to a single feeding port, which is an input port proximal to the first channel 126A or the opposite second channel 126B and the received excitation signals are fed to port 3 of the third channel 126C and port 4 of the opposite fourth channel 126D, as shown in FIG. 3B2. To facilitate dual-port excitation by signal port input, the PCB comprises a pair of L-shaped strip feeds which is configured to split the excitation signal to two ports.

In example embodiments, the antenna electronics comprise a first PCB 152 and a second PCB 156 each one of which is connected to an RF connector to excite four ports at the same time, as shown in FIG. 3D. In the embodiment of FIG. 3D, the first PCB 152 is mounted above the base portion while the second PCB 156 is mounted below the base portion of the antenna chassis 30 such that the base portion is in abutment with both the first PCB and the second PCB 156. A first RF connector 154A extends through the base portion and the second PCB 156 to feed excitation signal to the upper surface of the base portion. A second RF connector 154B is configured to feed excitation signal to the lower or bottom surface of the base portion.

Performance characteristics of an example complementary antenna of FIGS. 3B1, 3B2 and 3D and having an example center frequency of 2.6 GHZ are shown in FIGS. 4A1, 4A2, 4B1, 4B2, 4C and to 4D.

The radiation patterns when excitation signals are applied to a single feed port (port 1 excitation) as shown in FIG. 3B1 comprise a first set of radiation patterns shown in FIG. 4A1 and a second set of radiation patterns shown in FIG. 4A2. The first set of radiation patterns are radiation patterns in the U-Z plane and the second set of radiation patterns are radiation patterns in the V-Z plane. The U-Z plane is defined by cooperation of the U-axis and the Z-axis and the V-Z plane are defined by cooperation of the V-axis and the Z-axis, where the U-, V- and Z-axes are orthogonal axis, the V-axis is rotated relative to the Y axis and about the Z-axis by 45 degrees in the clockwise direction, and the U-axis is rotated relative to the X axis and about the Z-axis by 45 degrees in the clockwise direction. In FIGS. 4A1 and 4A2, the solid line shows the radiation pattern with −45 degrees polarization and the dotted line shows the radiation pattern with +45 degrees polarization.

The radiation patterns when excitation signals are applied to a single feed port (port 2 excitation) as shown in FIG. 3B2 comprise a first set of radiation patterns shown in FIG. 4B1 and a second set of radiation patterns shown in FIG. 4B2. The first set of radiation patterns are radiation patterns in the U-Z plane and the second set of radiation patterns are radiation patterns in the V-Z plane. In FIGS. 4B1 and 4B2, the solid line shows the radiation pattern with +45 degrees polarization and the dotted line shows the radiation pattern with −45 degrees polarization.

Figure 4C:
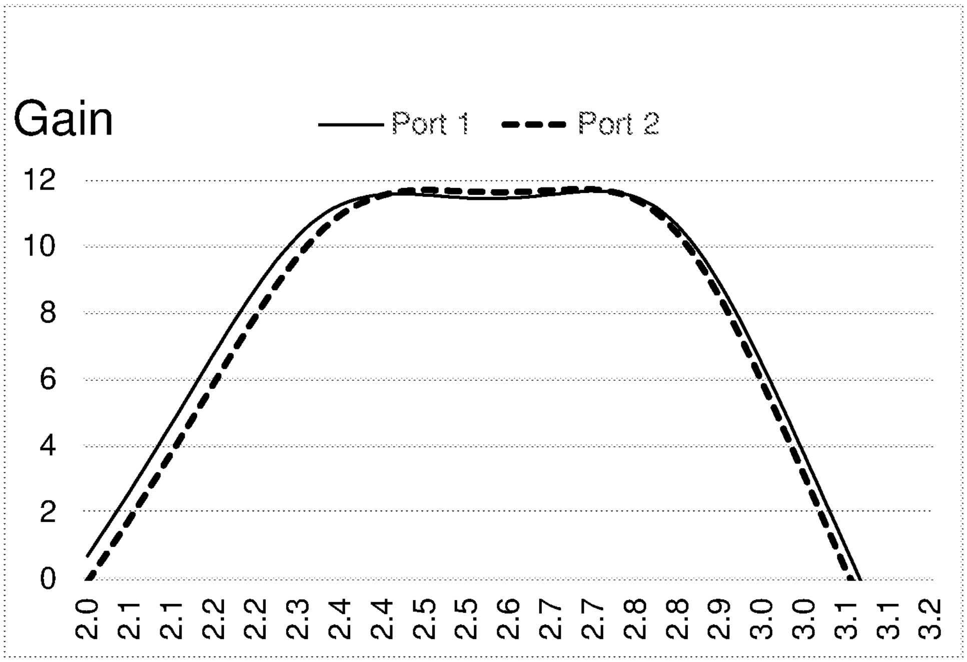
FIG. 4C is a diagram showing typical gain-frequency characteristics of a complementary antenna according to the disclosure, with frequency in units of GHz (x-axis) and gain in dBi (y-axis)
Figure 4D:
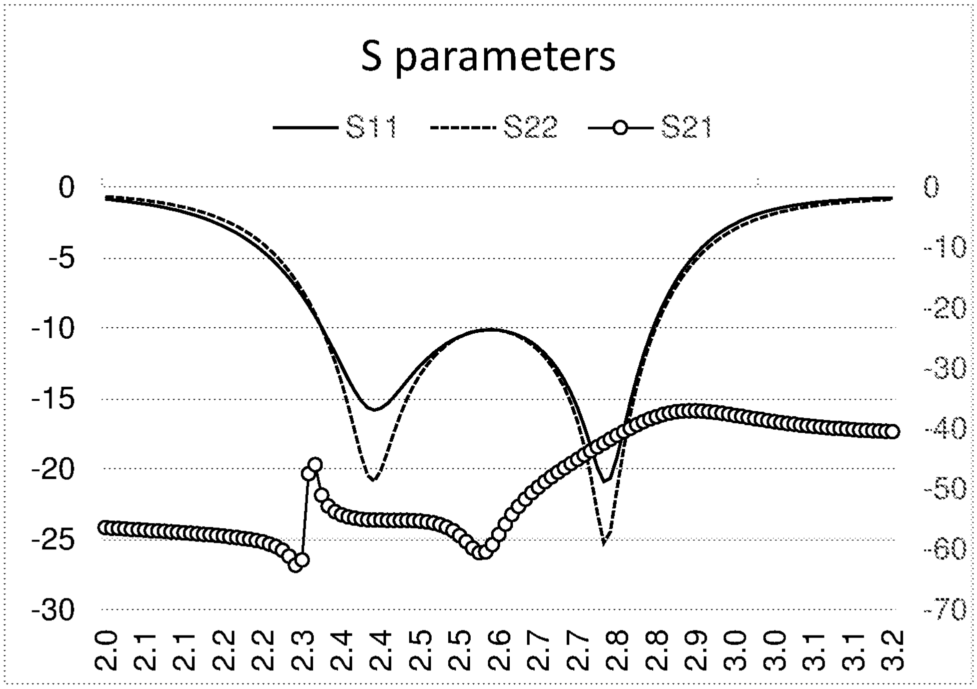
FIG. 4D is a diagram showing typical S-parameter characteristics of a complementary antenna according to the disclosure, with frequency in units of GHz (x-axis) and gain in dBi (y-axis)

The example complementary ME antenna of FIG. 3D has a maximum gain of approximately 11.5 dBi, as shown in FIG. 4C. The gain characteristics are approximately equal and independent of the excitation mode, i.e., port 1 excitation or port 2 excitation, as shown in FIGS. 4C and 4D. The example complementary ME antenna has a bandwidth of about 0.5 GHz, which is approximately 20% of the example center frequency of 2.6 GHz.

The example complementary antenna comprises an example plurality of two or four planar portions on each of which an electric dipole portion is defined. It should be appreciated that a complementary antenna according to the present disclosure may comprise a plurality of two, three, four, five, six, seven, eight, nine, ten or more planar portions on each of which an electric dipole portion is defined. The planar portions are distributed around a center axis, which is an axis orthogonal to the base portion, that is, the Z-axis which passes through the center Z of the base portion. In example embodiments, the planar portions and the channels are distributed at uniform angular intervals and/or at uniform radial distance with respect to the Z-axis. In example embodiments, an antenna chassis according to the present disclosure has the outline of a regular polygon, such as a regular rhombus, a regular pentagon, a regular hexagon, etc., with the channels lie on diagonals of the regular polygon.

Figure 5A:
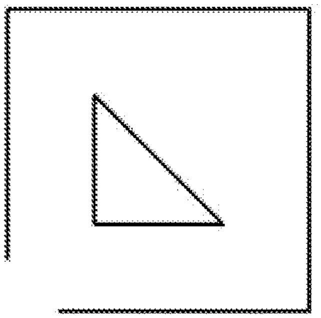
FIGS. 5A to 5I show various shapes, configurations and orientations of the planar portions and/or the higher resistivity portions.
Figure 5B:
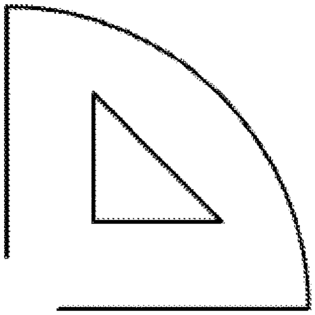
Figure 5C:
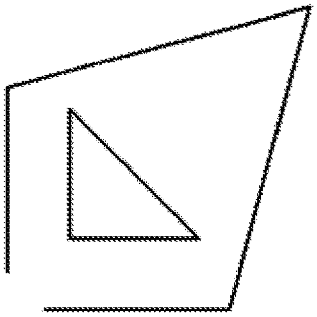

A planar portion of an electric dipole may have shapes difference to that of FIG. 1, 2 or 3. For example, the planar portion, a highly conductive portion, may have the shape of a right-angled triangle, with the sides including the right angle parallel to adjacent channel axes and with its hypotenuse cooperating with the higher resistivity portion to define the electric dipole current path, as shown in FIGS. 2 and 3; may have the shape of a non-right angled triangle, for example, an isosceles or equilateral triangle having an included angle of less than 90 degrees between the two equal adjacent sides which are parallel to adjacent channels; may have a square outline, with two outer sides of the square cooperating with the higher resistivity portion to define the electric dipole current path, as shown in FIG. 5A; may have the shape of a circular sector, with an arcuate outer side cooperating with the higher resistivity portion to define the electric dipole current path, as shown in FIG. 5B; a kite shape or a rhombic shape, with two outer sides of the rhombus cooperating with the higher resistivity portion to define the electric dipole current path, as shown in FIG. 5C. Where the planar portion has the shape of an isosceles or equilateral triangle, the angle included between two equal adjacent sides may be uniform and equal to 360 degrees divided by the number of planar portions forming the antenna chassis.

Figure 5D:
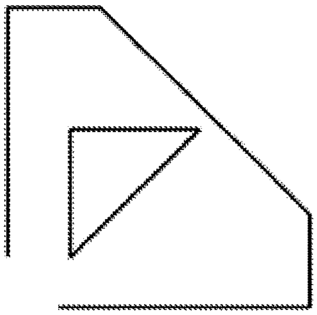
Figure 5E:
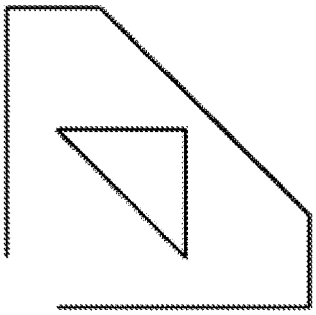
Figure 5F:
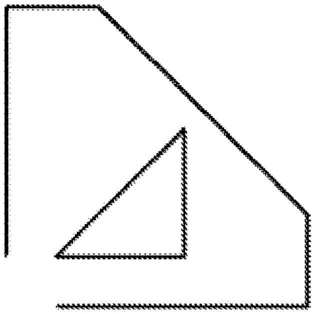

The higher resistivity portion may have different orientations, as shown in FIGS. 5D, 5E and 5F.

The higher resistivity portion may have a shape and configuration which is different to that of the example embodiments. For example, the higher resistivity portion may have an outline resembling a polygon, including a triangle, a rectangle, a rhombus, a pentagon, a hexagon, etc.; a circle; an oval; or a non-geometric shape.

Figure 5G:
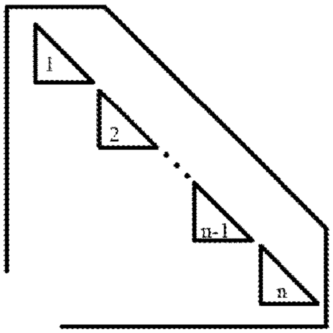
Figure 5H:
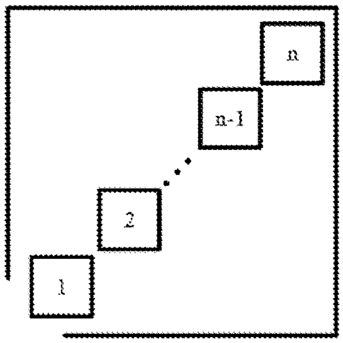
Figure 5I:
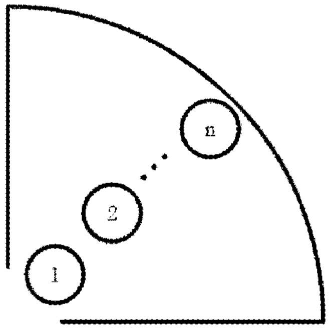

The higher resistivity portion may be made up of a plurality of shapes arranged in series, as shown in FIGS. 5G, 5H and 5I; and the shapes forming the higher resistivity portion may be same or different.

While the present disclosure has been made with reference to embodiments and examples described herein, it should be appreciated that the embodiments and examples are non-limiting and should not be construed to limit the scope of disclosure. Furthermore, while antenna electronics for signal transmission has been described, persons skilled in that art would appreciate that the disclosure applies mutatis mutandis and in reciprocity to antenna electronics for signal reception without loss of generality.

The invention claimed is:

1. An antenna comprising a magneto-electric dipole or a plurality of magneto-electric dipoles, wherein the magneto-electric dipole is a composite dipole comprising an electric dipole and a magnetic dipole in electromagnetic coupling, wherein the magnetic dipole comprises a first magnetic patch portion and a second magnetic patch portion which are physically interconnected at a base portion and which cooperate to define a patch antenna having an inter-patch channel, the channel extending along a channel axis to define a channel length and having a channel width and a channel height; wherein the electric dipole comprises a plurality of planar portions including a first planar portion on which a first electric dipole portion is defined and a second planar portion on which a second electric dipole portion is defined, the first planar portion and the second planar portion having a first electrical conductivity of metal; and wherein the electric dipole portion is configured to define an electric signal current path having a width smaller than the channel length; and/or wherein the electric dipole portion comprises a higher resistivity portion which defines a region of a second electrical conductivity of non-metal which is intermediate an electric dipole portion and the magnetic dipole.

2. The antenna of claim 1, wherein the electric dipole and the magnetic dipole are interconnected such that the channel is intermediate the first electric dipole portion and the second electric dipole portion, wherein the planar portion is elevated by an axial distance above the base portion, and wherein the higher resistivity portion is at same axial level as the electric dipole portion, the axial level measured in a direction orthogonal to a bottom surface of the base portion.

3. The antenna of claim 1, wherein the planar portion is in abutment with an upper end of the channel, and the base portion comprises a metal portion having the first electrical conductivity; and wherein the electric dipole portion and the higher resistivity portion cooperate to define an electric signal current path of the electric dipole.

4. The antenna of claim 1, wherein the first electric dipole portion and the second electric dipole portion are mirror-symmetrically disposed about the channel axis, and wherein the first electric dipole portion and the second electric dipole portion cooperate to form an included angle of less than 180 degrees, including between 90 degrees and 120 degrees.

5. The antenna of claim 1, wherein the electric dipole portion extends at an angle of extension which is less than 90 degrees or between 30 and 60 degrees with respect to the channel axis to define a direction of electric signal current flow of the electric dipole of less than 90 degrees with respect to the channel axis.

6. The antenna of claim 1, wherein the electric dipole portion extends between a first end which is proximal to the channel and distal from the base portion, and a second end which is distal from the channel and proximal to the base portion to define the electric signal current path of the electric dipole.

7. The antenna of claim 1, wherein the electric dipole portion defines an electric signal current path having a width or a minimum width which is smaller than the channel length.

8. The antenna of claim 1, wherein the electric dipole portion is configured such that the electric signal current path has a path width or a minimum path width which is smaller than the channel length.

9. The antenna of claim 1, wherein the electric dipole portion comprises a plurality of wing portions of the first electrical conductivity, the plurality of wing portions including a wing portion on which the electric dipole portion is defined; and wherein the plurality of wing portions of the first electrical conductivity is in abutment with the higher resistivity portion.

10. The antenna of claim 9, wherein the plurality of wing portions of the first electrical conductivity which is in abutment with the higher resistivity portion comprises a first wing portion which is in abutment with the channel and a wing portion on which the electric dipole portion is defined, and wherein the higher resistivity portion is included between the first wing portion and the wing portion defining the electric dipole portion.

11. The antenna of claim 10, wherein the plurality of wing portions of the first electrical conductivity comprises a second wing portion which is in abutment with the base portion, and the plurality of wing portions of the first electrical conductivity surrounds the higher resistivity portion.

12. The antenna of claim 10, wherein the wing portion on which the electric dipole portion is defined is cantilevered by the first wing portion to project away from the channel and from the base portion and overhang a ground plane.

13. The antenna of claim 1, wherein the electric dipole portion is defined on a wing portion which extends between a first end which is a first junction proximal to the channel and distal from the and a second end which is a second junction distal from the channel and proximal to the base portion; and wherein the first end has a width, measured in a direction parallel to the channel axis, which is substantially shorter than the channel length.

14. The antenna of claim 13, wherein the second end has a width, measured in a direction orthogonal to the channel axis, which is substantially shorter than the channel length.

15. The antenna of claim 1, wherein the first magnetic patch portion comprises a first sidewall having a first inner surface and the second magnetic patch portion comprises a second sidewall having a second inner surface, the first inner surface and the second inner surface being opposite facing and cooperating to define a first inner surface and a second inner surface of the channel; and wherein the sidewall has a height which gradually decreases or which tapers to narrow on extending away from the base portion.

16. The antenna of claim 15, wherein the first sidewall has a first end which is in abutment with the base portion and a second end which is distal from and overhangs the base portion.

17. The antenna of claim 1, wherein the electric dipole comprises a plurality of planar portions comprising a first planar portion on which the first electric dipole portion is formed and a second planar portion on which the second electric dipole portion is formed, and wherein the channel has an upper end which physically interconnects the first planar portion and the second planar portion; and wherein the planar portion has a height, measured with respect to the base portion, and the height of the planar portion is less than $0.2\lambda_0$.

18. The antenna of claim 1, wherein the planar portions of the antenna are distributed to have an outline of a regular polygon, and the channels are on diagonals of the regular polygon.

19. The antenna of claim 1, wherein the antenna has a height of less than 0.2 wavelength.

20. An antenna chassis of an antenna according to claim 1, comprising a plurality of wing portions each defining an electric dipole portion, wherein the wing portions is a planar portion and the wing portions are distributed to form sides of a regular polygon, and the channels are disposed on diagonals of the regular polygon.

* * * * *